(12) United States Patent
Minami

(10) Patent No.: US 9,407,745 B2
(45) Date of Patent: Aug. 2, 2016

(54) ELECTRONIC APPARATUS, WATER DETECTION MEANS CONTROL METHOD, AND ELECTRONIC APPARATUS OPERATION MODE SETTING METHOD

(75) Inventor: Takashi Minami, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 13/884,222

(22) PCT Filed: Feb. 7, 2012

(86) PCT No.: PCT/JP2012/052787
§ 371 (c)(1),
(2), (4) Date: May 8, 2013

(87) PCT Pub. No.: WO2012/108443
PCT Pub. Date: Aug. 16, 2012

(65) Prior Publication Data
US 2013/0225237 A1    Aug. 29, 2013

(30) Foreign Application Priority Data
Feb. 9, 2011    (JP) .................................. 2011-026390

(51) Int. Cl.
*H04M 1/18* (2006.01)
*H04W 52/02* (2009.01)
(Continued)

(52) U.S. Cl.
CPC ............ *H04M 1/18* (2013.01); *H04M 1/72569* (2013.01); *H04N 5/232* (2013.01); *H04W 52/0245* (2013.01); *H04W 52/0251* (2013.01); *H04M 2250/12* (2013.01)

(58) Field of Classification Search
CPC ......... H04M 1/18; H04M 1/185; H04M 1/19; H04M 1/21; H04M 1/215; H04M 1/02; H04M 1/03; H04M 1/035; H04M 1/72569; H04M 2250/12; H04M 2250/20; H04M 2250/22; H04M 2250/52; H04N 5/232; H04N 5/23212
USPC .............. 455/556, 418, 3.06, 420, 13.4, 41.3, 455/67.11, 552.1, 556.1, 557; 348/223.1, 348/207.1, 234, 222.1, 143, 136, 195, 371; 340/573.4, 573.6; 396/155; 73/73
See application file for complete search history.

(56) References Cited

U.S. PATENT DOCUMENTS 5,382,499 A * 1/1995 Keelan et al. ................. 430/503
5,963,130 A    10/1999 Schlager et al.
(Continued)

FOREIGN PATENT DOCUMENTS

CN    1736087 A    2/2006
CN    101206384 A    6/2008
(Continued)

OTHER PUBLICATIONS

Communication dated Jul. 7, 2014, issued by the European Patent Office in counterpart European application No. 12744429.7.
(Continued)

*Primary Examiner* — Tan H Trinh
(74) *Attorney, Agent, or Firm* — Sughrue Mion, PLLC

(57) ABSTRACT

An electronic device (10) is capable of operating in water. The electronic device (10) has communication means (120), water detection means (35), and control means (100). The communication means (120) receives a radio wave. The water detection means (35) detects whether the electronic device (10) is immersed in water or not. The control means (100) makes the water detection means (35) operate in the case where intensity of a reception signal of the radio wave received by the communication means (120) is lower than a threshold level.

10 Claims, 7 Drawing Sheets

(51) Int. Cl.
*H04M 1/725* (2006.01)
*H04N 5/232* (2006.01)

(56) References Cited

U.S. PATENT DOCUMENTS

| | | | | |
|---|---|---|---|---|
| 6,026,288 | A * | 2/2000 | Bronner | H04B 1/26 455/254 |
| 6,489,895 | B1 * | 12/2002 | Apelman | G01M 3/18 137/312 |
| 6,631,264 | B1 * | 10/2003 | Leickel | H04W 36/30 455/434 |
| 8,311,595 | B2 * | 11/2012 | Takatsuka et al. | 455/575.1 |
| 8,432,452 | B2 * | 4/2013 | Moriyama | 348/207.1 |
| 8,979,554 | B2 * | 3/2015 | Yudate | 439/76.1 |
| 9,013,036 | B2 * | 4/2015 | Yeh | 257/710 |
| 2002/0021227 | A1 * | 2/2002 | Mizuno | G07C 5/008 340/904 |
| 2002/0052159 | A1 * | 5/2002 | Eguchi | 441/80 |
| 2002/0175820 | A1 * | 11/2002 | Oja | G08B 21/0222 340/573.4 |
| 2003/0210147 | A1 * | 11/2003 | Humbard | 340/573.1 |
| 2004/0092200 | A1 * | 5/2004 | Ishimoto | A63H 23/04 446/153 |
| 2004/0108861 | A1 * | 6/2004 | Germiquet et al. | 324/663 |
| 2004/0176127 | A1 * | 9/2004 | Ballantyne | G01S 19/34 455/552.1 |
| 2006/0016896 | A1 | 1/2006 | Grupp | |
| 2006/0114335 | A1 * | 6/2006 | Hara | H04N 9/735 348/223.1 |
| 2006/0202839 | A1 | 9/2006 | Vannerus et al. | |
| 2007/0030156 | A1 * | 2/2007 | Schlager | A61N 1/08 340/573.1 |
| 2007/0132578 | A1 * | 6/2007 | Powell | G08B 21/023 340/539.26 |
| 2007/0247307 | A1 * | 10/2007 | Riep | 340/539.13 |
| 2008/0111913 | A1 * | 5/2008 | Okamoto | 348/363 |
| 2008/0119140 | A1 * | 5/2008 | Maligeorgos | H04B 15/02 455/67.13 |
| 2009/0027211 | A1 * | 1/2009 | Cutler et al. | 340/573.6 |
| 2009/0096896 | A1 * | 4/2009 | Imafuji et al. | 348/234 |
| 2009/0163144 | A1 * | 6/2009 | Nakatsugawa | H04W 24/10 455/67.13 |
| 2009/0189981 | A1 * | 7/2009 | Siann et al. | 348/143 |
| 2010/0053323 | A1 * | 3/2010 | Izawa | 348/136 |
| 2010/0328076 | A1 * | 12/2010 | Kyle | G06F 19/327 340/573.1 |
| 2011/0019009 | A1 * | 1/2011 | Moriyama | 348/207.1 |
| 2011/0058085 | A1 * | 3/2011 | Ito et al. | 348/333.02 |
| 2011/0105100 | A1 * | 5/2011 | Tanaka | H01H 13/702 455/418 |
| 2011/0174235 | A1 * | 7/2011 | Vinano et al. | 119/712 |
| 2011/0187890 | A1 * | 8/2011 | Takayama et al. | 348/223.1 |
| 2011/0273998 | A1 * | 11/2011 | Mudrick | H04L 43/08 370/252 |
| 2014/0043186 | A1 * | 2/2014 | Karayil Thekkoott | G01S 19/03 342/176 |

FOREIGN PATENT DOCUMENTS

| | | |
|---|---|---|
| CN | 101562702 A | 10/2009 |
| JP | 2004-015312 A | 1/2004 |
| JP | 2006-166360 A | 6/2006 |
| JP | 2008-283406 A | 11/2008 |
| JP | 2009-229368 A | 10/2009 |
| JP | 2011-015363 A | 1/2011 |
| WO | 2009/157568 A1 | 12/2009 |

OTHER PUBLICATIONS

Communication dated Nov. 4, 2014 from the State Intellectual Property Office of People's Republic of China in counterpart application No. 201280004373.5.
Communication dated Jul. 17, 2015 from the State Intellectual Property Office of the People's Republic of China in counterpart application No. 201280004373.5.

* cited by examiner

Fig.3A

First Operation Mode

50

| Function | Operation State |
|---|---|
| Verbal Communication Function | ON |
| Email Function | ON |
| Imaging Function | ON |
| Recording Function | ON |
| Vibrating Function Upon Call Reception | ON |

Fig.3B

Second Operation Mode

51

| Function | Operation State |
|---|---|
| Verbal Communication Function | OFF |
| Email Function | OFF |
| Imaging Function | ON |
| Recording Function | OFF |
| Vibrating Function Upon Call Reception | OFF |

| Operation Mode | Reception Mode |
|---|---|
| First Operation Mode | Continuous Reception |
| Second Operation Mode | Intermittent Reception |

Fig.7A

First Operation Mode

70

| Imaging Parameter | Imaging Mode |
|---|---|
| Aperture Value | Regular |
| Shutter Value | Regular |
| Value of ISO Sensitivity | Regular |

Fig.7B

Second Operation Mode

71

| Imaging Parameter | Imaging Mode |
|---|---|
| Aperture Value | Regular |
| Shutter Value | Faster than That in First Operation Mode |
| Value of ISO Sensitivity | Higher than That in First Operation Mode |

ELECTRONIC APPARATUS, WATER DETECTION MEANS CONTROL METHOD, AND ELECTRONIC APPARATUS OPERATION MODE SETTING METHOD

CROSS REFERENCE TO RELATED APPLICATIONS

This application is a National Stage of International Application No. PCT/JP2012/052787, filed on Feb. 7, 2012, which claims priority from Japanese Patent Application No. 2011-026390, filed on Feb. 9, 2011, the contents of all of which are incorporated herein by reference in their entirety.

TECHNICAL FIELD

The present invention relates to an electronic device, a water detection means control method, and an electronic device operation mode setting method.

BACKGROUND ART

Some electronic devices such as a cellular phone have predetermined waterproof property. Users are able to use those electronic devices in water.

However, a part of the functions does not work in water. For example, in the case of immersing a cellular phone in water, a radio wave transmitted from a basestation is considerably attenuated by water. Consequently, the cellular phone enters a so-called out-of-service state and the user is unable to use a telephone call function or the like. Nevertheless, the cellular phone repeats receiving operation to receive a communication radio wave, so the power of the battery or the like provided for the cellular phone is consumed.

An electronic device disclosed in Patent Literature 1 stops receiving a radio wave when a detector detects that the device is in water.

PRIOR ART LITERATURE

Patent Literature

Patent Literature 1: Unexamined Japanese Patent Application Kokai Publication No. 2009-229368

DISCLOSURE OF THE INVENTION

Problem to be Solved by the Invention

Power is always supplied to the detector provided for the electronic device described in Patent Literature 1, and power is uselessly consumed.

The present invention is achieved by paying attention to such a problem and an object of the invention is to provide an electronic device that is operable in water and whose power consumption is low.

Means for Solving the Problem

To achieve the object, according to a first aspect of the present invention, there is provided an electronic device that is able to operate in water, including:
communication means that receives a radio wave;
water detection means that detects whether the electronic device is immersed in water or not; and
control means that makes the water detection means operate in the case where intensity of a reception signal of a radio wave received by the communication means is lower than a threshold level.

According to a second aspect of the present invention, there is provided a method of controlling water detection means, including:
a step of receiving a radio wave by communication means; and
a step of making water detection means operate in the case where intensity of a reception signal of a radio wave received by the communication means is lower than a threshold level.

According to a third aspect of the present invention, there is provided a method of setting an operation mode of an electronic device that is able to operate in water and is able to be set in two operation modes, including:
a step of receiving a radio wave by communication means;
a step of making water detection means operate in the case where intensity of a reception signal of a radio wave received by the communication means is lower than a threshold level; and
a step of changing the operation mode of the electronic device from one of the operation modes to the other operation mode in the case where the water detection means detects that the electronic device is immersed in water.

Effects of the Invention

The present invention is able to provide an electronic device that is able to operate in water and whose power consumption is small.

BRIEF DESCRIPTION OF DRAWINGS

FIG. 3A is a diagram for explaining an operation state of each of functions in a first operation mode of the cellular phone according to the embodiment of the invention;

FIG. 3B is a diagram for explaining an operation state of each of functions in a second operation mode of the cellular phone according to the embodiment of the invention;

FIG. 4 is a diagram for explaining a reception mode of a transceiver in the cellular phone according to the embodiment of the invention;

FIG. 7A is a diagram for explaining an image capturing mode of the imaging function in the first operation mode of a cellular phone according to a modification of the present invention; and FIG. 7B is a diagram for explaining the image capturing mode of the imaging function in the second operation mode of the cellular phone according to the embodiment of the present invention.

MODE FOR CARRYING OUT THE INVENTION

Hereinafter, an embodiment of the present invention will be described.

Embodiment

A cellular phone 10 as an embodiment of the present invention, whose exterior member is watertightly constructed, is operable in water.

Figure 1A:
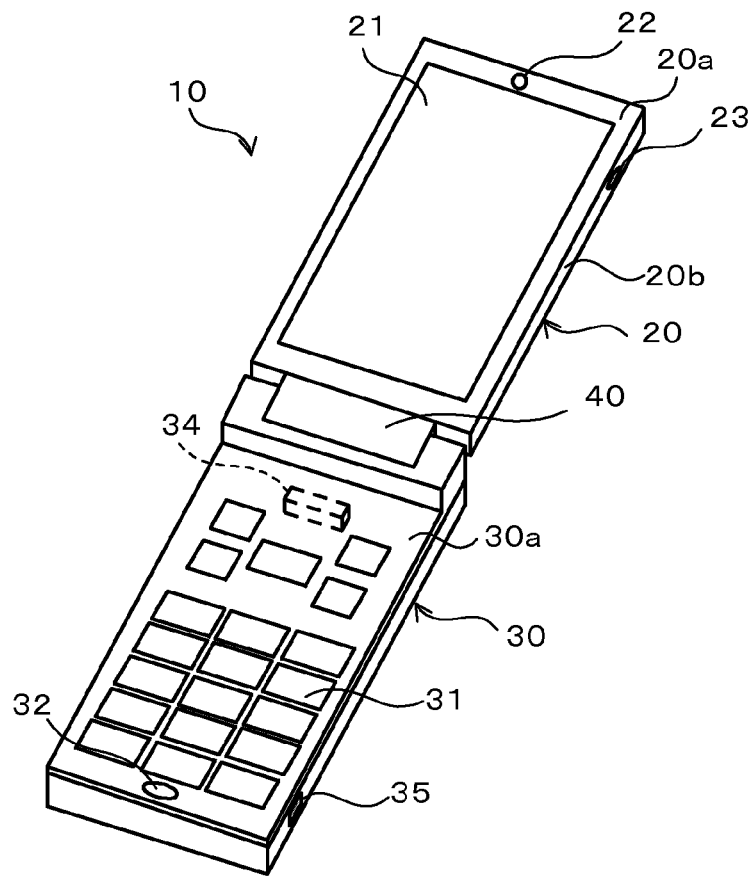
FIG. 1A is a perspective view illustrating a state where a cellular phone according to an embodiment of the present invention is open.
Figure 1B:
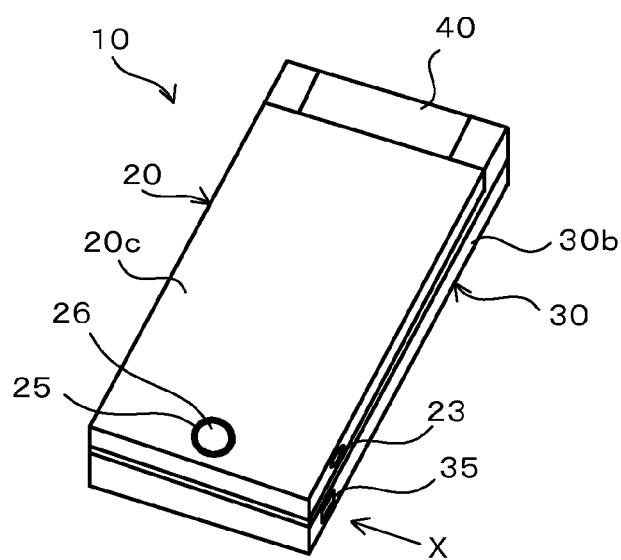
FIG. 1B is a perspective view illustrating a state where the cellular phone according to the embodiment of the present invention is closed.

As illustrated in FIGS. 1A and 1B, the cellular phone 10 has a first casing 20 and a second casing 30. The first and second casings 20 and 30 are coupled to each other via a hinge 40 so that they are opened/closed. The cellular phone 10 is a folding type.

The first casing 20 is provided with a display device 21, a speaker 22, an alarm outputter 23, and an imager 25 (refer to FIG. 1B). The second casing 30 is provided with a console 31, a microphone 32, and a water sensor 35. In the second casing 30, a vibrator 34 is provided.

The display device 21 is provided in a center part of a front face 20a of the first casing 20. The display device 21 is an LCD (Liquid Crystal Display) and displays characters, numerals, signs, images, and the like. The speaker 22 is disposed upper than the display device 21 and outputs various sounds. The alarm outputter 23 is disposed in a right side face 20b of the first casing 20 and outputs various alarms, ringtones, and the like. The imager 25 is provided in a rear face 20c of the first casing 20, constructed by a lens unit 26, a CMOS (Complementary Metal Oxide Semiconductor) image sensor (not illustrated), and the like, and captures a moving picture and a still picture.

The console 31 is provided in a center of a front face 30a of the second casing 30 and is constructed by a plurality of buttons and a switch. The user is able to enter characters, numerals, signs, and the like via the console 31. The console 31 also has a function as a shutter button of the imager 25.

The microphone 32 is provided below the console 31. The microphone 32 converts voice that is entered into an electric signal and outputs the electric signal to a transceiver 120. The vibrator 34 notifies reception of a signal by making vibrations at the time of reception of a signal or the like.

Figure 1C:
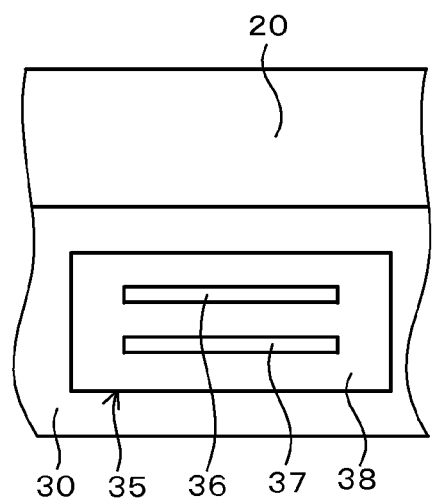
FIG. 1C is an enlarged view from the X direction of arrow in FIG. 1B.

The water sensor 35 is provided in a right side face 30b of the second casing 30. As illustrated in FIG. 1C, the water sensor 35 has electrodes 36 and 37 and a low-dielectric-constant circuit board 38. The two electrodes 36 and 37 are disposed closely in parallel to each other on the circuit board 38 and exposed to the outside. The water sensor 35 detects whether the cellular phone 10 is immersed in water or not on the basis of electric resistance between the two electrodes 36 and 37. Concretely, in the case where the cellular phone 10 is in air, current hardly flows across the electrodes 36 and 37, so the water sensor 35 detects electric resistance that is close to infinity. On the other hand, in the case where the cellular phone 10 is in water, the water sensor 35 detects electric resistance that is smaller than the above-described electric resistance.

Figure 2:
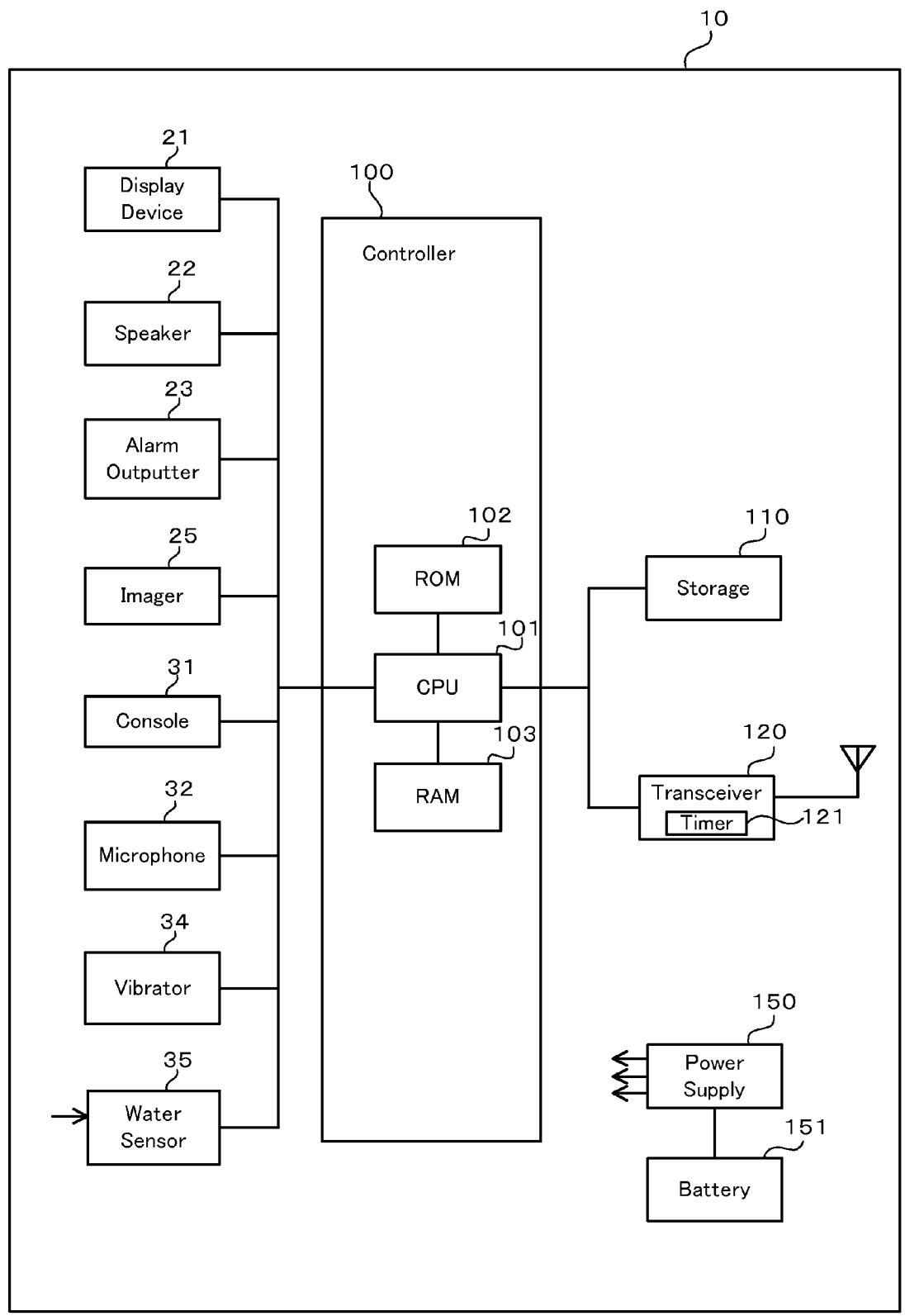
FIG. 2 is a block diagram illustrating the configuration of the cellular phone according to the embodiment of the invention.

As illustrated in FIG. 2, the cellular phone 10 having the above-described configuration has a controller 100, a storage 110, the transceiver 120, and a power supply 150. To the controller 100, the storage 110, the transceiver 120, the display device 21, the speaker 22, the alarm outputter 23, the imager 25, the console 31, the microphone 32, the vibrator 34, and the water sensor 35 are connected.

The controller 100 has a CPU (Central Processing Unit) 101, a ROM (Read Only Memory) 102, and a RAM (Random Access Memory) 103. The controller 100 controls the operations of the units connected.

The CPU 101 executes the OS (Operating System) and various programs such as an application program. The ROM 102 stores the various programs that are executed by the CPU 101. The RAM 103 is used as a work area of the CPU 101.

The storage 110 has a data area and a program area and stores various data and programs. For example, in the data area, a first operation mode table 50, a second operation mode table 51, and a reception mode table 60 that is illustrated in FIG. 4 are provided. In the program area, a program for realizing the embodiment in accordance with an operation procedure that will be described later is stored.

As illustrated in FIG. 3A, the first operation mode table 50 specifies whether each of the functions of the cellular phone 10 is usable in a first operation mode (operation mode when the cellular phone 10 is above the ground). Name data of each of the functions of the cellular phone 10 and data indicating whether the function is valid or not in the first operation mode is stored so as to be associated with each other.

The first operation mode table 50 is referred to when the controller 100 sets the cellular phone 10 in the first operation mode. For example, as illustrated in FIG. 3A, when "verbal communication function" and "ON" are associated with each other, the controller 100 sets the verbal communication function of the cellular phone 10 to be usable when the first operation mode is set.

On the other hand, as illustrated in FIG. 3B, the second operation mode table 51 specifies whether each of the functions of the cellular phone 10 is usable in a second operation mode (operation mode when the cellular phone 10 is in water). Like in the first operation mode, name data of each of the functions of the cellular phone 10 and data indicating whether the function is valid or not in the second operation mode is stored so as to be associated with each other.

The second operation mode table 50 is referred to when the controller 100 sets the cellular phone 10 in the second operation mode. For example, as illustrated in FIG. 3B, when "verbal communication function" and "OFF" are associated with each other, the controller 100 sets the verbal communication function of the cellular phone 10 to be unusable when the second operation mode is set. An operation mode setting process will be described later with reference to a flowchart.

Referring again to FIG. 2, the transceiver 120 repeats receiving operation every predetermined time and captures communication radio waves from a basestation. The transceiver 120 has the functions of signal modulation/demodulation, frequency conversion, power amplification, and the like and transmits/receives radio waves via an antenna. That is, the transceiver 120 demodulates the radio wave received via the antenna to a sound signal, demodulates a signal from the controller 100, and transmits a radio wave via the antenna.

Further, the transceiver 120 measures the strength of the received communication radio wave, that is, RSSI (Receive Signal Strength Indication). The transceiver 120 measures whether the RSSI is lower than a threshold level preliminarily stored in the storage 110 or not. In the case where the transceiver 120 detects the RSSI lower than the threshold level, the cellular phone 10 is so-called out-of-service or in a state close to the out-of-service. On the other hand, in the case where the transceiver 120 detects the RSSI equal to or higher than the threshold level, the cellular phone 10 exists in the so-called within communication range. The threshold level is preliminarily determined on the basis of a level necessary to reliably capture information transmitted from the basestation.

The transceiver 120 has a timer 121 for measuring radio wave reception time. The transceiver 120 refers to the reception mode table 60 illustrated in FIG. 4 and selects either continuous reception or intermittent reception. In the reception mode table 60, data specifying the reception mode of the transceiver 120 in each of the operation modes is stored. In the case where the cellular phone 10 is in the first operation mode, the continuous reception mode is set, and the transceiver 120 continuously receives signals, for example, every 10µ seconds. In the case where the cellular phone 10 is in the second operation mode, the intermittent reception mode is set, and the transceiver 120 intermittently receives signals, for every one second.

The power supply 150 has a battery 151 and supplies drive power to the controller 100.

Figure 5:
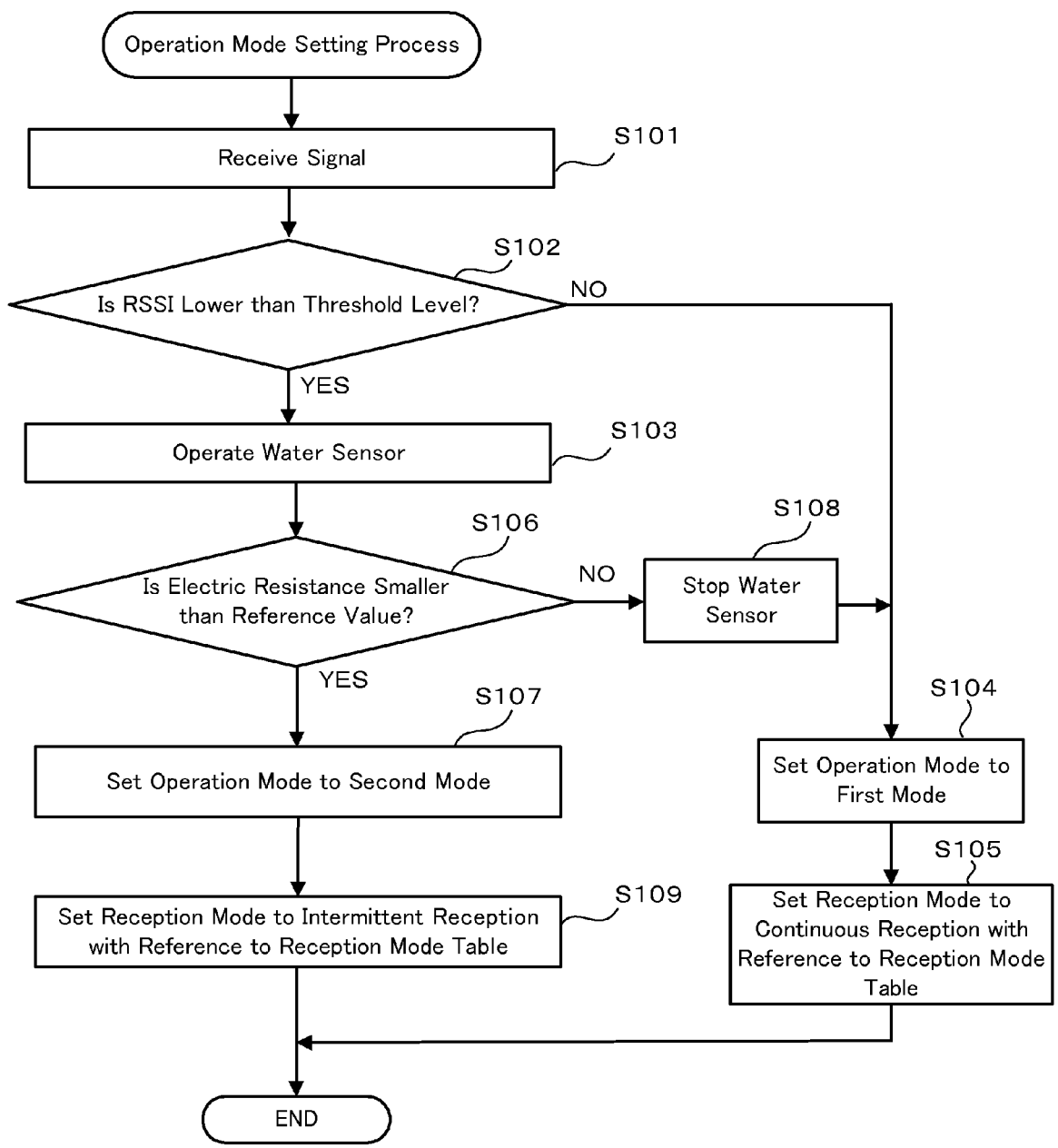
FIG. 5 is a flowchart illustrating operation mode setting process of the cellular phone according to the embodiment of the invention.

Next, a process of setting the operation mode of the cellular phone 10 will be described with reference to the flowchart of FIG. 5. The cellular phone 10 is set in the first operation mode (refer to FIG. 3A) when the power is turned on.

First, the CPU 101 makes the transceiver 120 execute receiving operation every predetermined time, for example, every 100 ms to receive a signal from a wireless basestation (step S101).

The CPU 101 makes the transceiver 120 determine whether or not the RSSI is lower than the threshold level that is preliminarily stored in the storage 110 (step S102). In the case where the transceiver 120 determines that the RSSI of a received radio wave is lower than the threshold level that is preliminarily stored in the storage 110 (Yes in step S102), that is, in the case where the cellular phone 10 is in the so-called out-of-service state or a state close to the out-of-service, the flow shifts to step S103.

On the other hand, in the case where the RSSI is equal to or higher than the threshold level (No in step S102), that is, in the case where the cellular phone 10 exists within the communication range, the CPU 101 sets the operation mode to the first operation mode (step S104), sets the reception mode of the transceiver 120 to the continuous reception mode with reference to the reception mode table 60 (step S105), and temporarily finishes the process.

In step S103, the CPU 101 makes the water sensor 35 operate. Concretely, the CPU 101 applies voltage across the electrodes 36 and 37 of the water sensor 35.

The water sensor 35 measures electric resistance between the two electrodes 36 and 37 and determines whether the measured electric resistance is smaller than a reference value or not, for example, whether the electric resistance is close to 0Ω not (step S106). In the case where the electric resistance between the two electrodes 36 and 37 is smaller than the reference value (Yes in step S106), that is, in the case where water exists between the two electrodes 36 and 37, the flow shifts to step S107.

On the other hand, in the case where the electric resistance between the two electrodes 36 and 37 is equal to or larger than the reference value (No in step S106), that is, in the case where no water exists between the two electrodes 36 and 37, the CPU 101 stops the water sensor 35 (step S108). The CPU 101 sets the operation mode to the first operation mode (step S104) and sets the reception mode of the transceiver 120 to the continuous reception mode with reference to the reception mode table 60 (step S105). The CPU 101 temporarily finishes the process.

In step S107, the CPU 101 sets the operation mode of the cellular phone 10 to the second operation mode (refer to FIG. 3B).

The CPU 101 sets the reception mode of the transceiver 120 to the intermittent reception mode with reference to the reception mode table 60 (step S109) and finishes the setting of the operation mode of the cellular phone 10.

By the above operation, the cellular phone 10 is set in the first or second operation mode. The CPU 101 determines whether each of the functions of the cellular phone 10 is validated or not on the basis of the set operation mode.

Next, the operation of the cellular phone 10 when each of the functions is used after the operation mode is set will be described with reference to the flowchart of FIGS. 6A and 6B. First, email receiving process will be described. As a premise, as illustrated in FIG. 3A, the email function is set to the on state in the first operation mode and is set to the off state in the second operation mode.

Figure 6A:
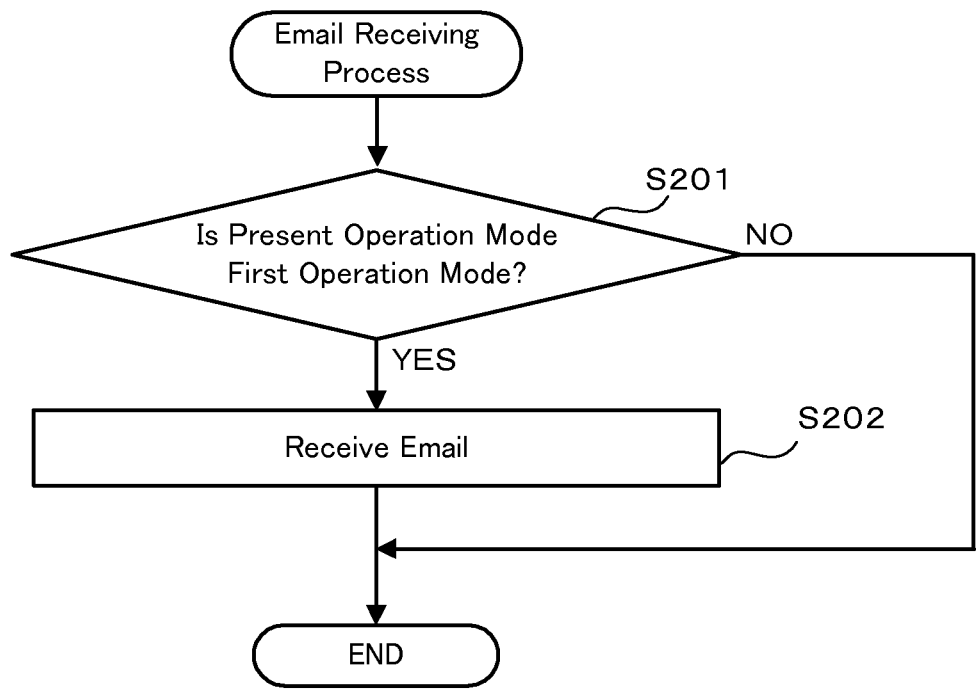
FIG. 6A is a flowchart illustrating email receiving process of the cellular phone according to the embodiment of the invention.

As illustrated in FIG. 6A, the CPU 101 executes the operation mode setting process (refer to FIG. 5) and, after that, determines whether the present operation mode is the first operation mode or not (step S201). In the case where the present operation mode is the first operation mode (Yes in step S201), the CPU 101 instructs the transceiver 120 to receive an email (step S202). On the other hand, in the case where the present operation mode is not the first operation mode (No in step S201), that is, is the second operation mode, the CPU 101 finishes the process.

In the embodiment, calling process, recording process, and call-reception vibrating process of the cellular phone 10 are set to the on state in the first operation mode and are set to the off state in the second operation mode like in the above-described email receiving process. Since the processes are similar to the above-described email receiving process, the description will not be repeated.

The imaging process that is set to the on state in the first and second operation modes will now be described.

Figure 6B:
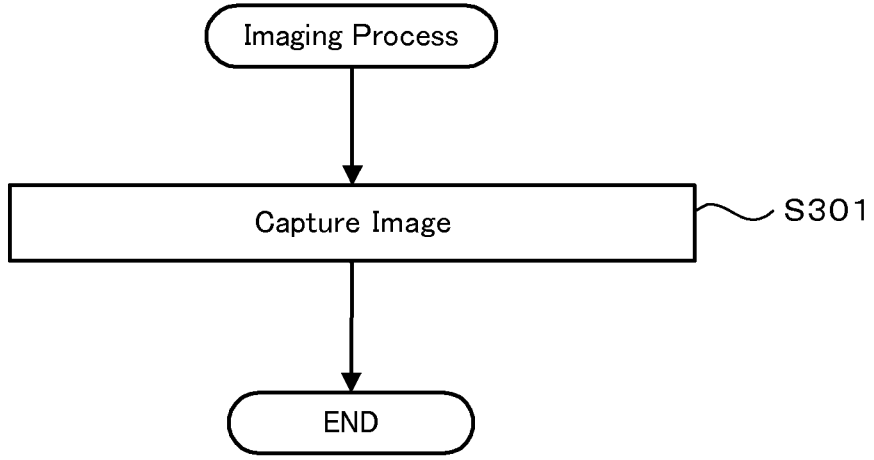
FIG. 6B is a flowchart illustrating image process of the cellular phone according to the embodiment of the invention.

As illustrated in FIG. 6B, regardless of whether the present operation mode is the first or second operation mode, the CPU 101 instructs the imager 25 to capture an image (step S301), and finishes the imaging process of the cellular phone 10.

As described above, the functions that do not have to be operated in water are regulated in the second operation mode. Consequently, it is effective to reduce consumption power.

Further, in the cellular phone 10 of the embodiment, the water sensor operates only in the case where the cellular phone 10 is so-called out-of-service or in a state close to the out-of-service state. Therefore, power consumed by continuous operation of the water sensor is able to be reduced.

In the cellular phone 10 of the embodiment, only in the case where the RSSI of a received radio wave is lower than the threshold level and water is sensed by the water sensor, the operation mode is set to the second operation mode. In such a manner, even when the cellular phone 10 is used underground or the like where a radio wave is not easily received, the operation mode is not set to the second operation mode, so the convenience for the user is not deteriorated.

The present invention is not limited to the foregoing embodiment and is able to be variously modified.

In the foregoing embodiment, in the first or second operation mode, each of the functions of the cellular phone 10 is set to either ON or OFF. However, the setting of the operation mode as in the embodiment is an example, and the invention is not limited to the setting. Each of the functions is set to ON in both of the first and second operation modes, and the operations of the functions are varied, in some cases.

For example, in the imaging function, imaging parameters suitable for imaging out of water are specified in the first operation mode, and imaging parameters suitable for imaging in water are specified in the second operation mode, in some cases.

In this case, in the data area of the storage 110, a first imaging mode table 70 illustrated in FIG. 7A and a second imaging mode table 71 illustrated in FIG. 7B are provided.

In the first imaging mode table 70, each of the imaging parameters in the first operation mode of the cellular phone 10 and data specifying an imaging mode in the first operation mode are stored so as to be associated with each other. In the first operation mode, imaging parameters such as an aperture value, shutter speed, and a value of ISO (International Organization for Standardization) sensitivity are set so as to be adapted to imaging operation above ground.

In the second imaging mode table 71, each of the imaging parameters in the second operation mode of the cellular phone 10 and data specifying an imaging mode in the second operation mode are stored so as to be associated with each other. In the second operation mode, imaging parameters are set so as to be adapted to imaging operation in water. In the imaging parameters, for example, the shutter speed is set to be faster than that in the first operation mode, and the value of ISO sensitivity is set to be higher than that in the first operation mode. By the settings, a picture with little blurring caused by hand movement is able to be taken.

As described above, when the cellular phone 10 is immersed in water, the operation mode is changed from the first operation mode to the second operation mode. Consequently, the operation mode is automatically set so as to be suitable to underwater imaging, and the usability of the cellular phone 10 improves.

Although the water sensor 35 used in the foregoing embodiment detects whether the cellular phone 10 is immersed in water or not by measuring electric resistance between the two electrodes 36 and 37, the invention is not limited to the detection. Whether the cellular phone 10 is immersed in water or not is detected by measuring pressure by a pressure sensor, in some cases. For example, in the case of using a semiconductor pressure sensor using a silicon diaphragm as a pressure sensor, the diaphragm is disposed on the outer face of the casing of an electronic device, in some cases. In the case where the electronic device is immersed in water, the diaphragm is deformed by water pressure. By detecting the deformation amount as an amount of change in voltage in a Wheatstone bridge circuit disposed on the diaphragm, whether the cellular phone 10 is immersed in water or not is able to be detected.

In the embodiment, the threshold level is preliminarily determined on the basis of a level necessary to always reliably catch a radio wave from a basestation. The threshold level, however, is not limited to the above but is able to be arbitrarily set.

In the embodiment, all of the functions are set to the on state in the first operation mode. Only the imaging function is set to the on state and the other functions are set to the off state in the second operation mode. The invention is not limited to the setting. The on/off state of each of the functions in the first and second operation modes is able to be arbitrarily set.

The present invention is able to be applied to electronic devices such as various cellular phones, a PHS (Personal Handyphone System), a PDA (Personal Digital Assistant), a smartphone, a notebook-sized personal computer, and the like. That is, the above-described embodiment is provided for explanation and does not limit the scope of the present invention. Therefore, a person skilled in the art is able to employ embodiments obtained by replacing any or all of the elements to equivalents of embodiments to be described later, and the present invention also includes those embodiments.

A part or all of the foregoing embodiment is able to be also described as follows but the invention is not limited to the below.

Supplementary Note 1

An electronic device that is able to operate in water, including:

communication means that receives a radio wave;

water detection means that detects whether the electronic device is immersed in water or not; and control means that makes the water detection means operate in the case where intensity of a reception signal of a radio wave received by the communication means is lower than a threshold level.

Supplementary Note 2

The electronic device described in Supplementary Note 1, wherein the control means supplies power to the water detection means to make the water detection means operate.

Supplementary Note 3

The electronic device described in Supplementary Note 1 or 2, wherein the electronic device is able to be set, by the control means, in a first operation mode of specifying whether a predetermined function of the electronic device out of water is valid or not and a second operation mode of specifying whether a predetermined function of the electronic device in water is valid or not and, in the case where the water detection means detects that the electronic device is immersed in water, the control means sets the electronic device into the second operation mode.

Supplementary Note 4

The electronic device described in Supplementary Note 3, wherein a plurality of functions are set to be valid or invalid in the first and second operation modes, and a function specified to be valid in the second operation mode is a part of functions specified to be valid in the first operation mode.

Supplementary Note 5

The electronic device described in Supplementary Note 3 or 4, further including image capturing means, wherein the first operation mode is a mode of specifying an imaging parameter of the image capturing means out of water, and the second operation mode is a mode of specifying an imaging parameter of the image capturing means in water.

Supplementary Note 6

The electronic device described in Supplementary Note 5, wherein the imaging parameter is shutter speed of the image capturing means, and shutter speed specified in the second operation mode is faster than shutter speed specified in the first operation mode.

Supplementary Note 7

The electronic device described in Supplementary Note 5, wherein the imaging parameter is a value of ISO sensitivity of the image capturing means, and a value of ISO sensitivity specified in the second operation mode is higher than value of ISO sensitivity specified in the first operation mode.

Supplementary Note 8

A method of controlling water detection means, including:

a step of receiving a radio wave by communication means; and a step of making water detection means operate in the case where intensity of a reception signal of a radio wave received by the communication means is lower than a threshold level.

Supplementary Note 9

The method of controlling water detection means described in Supplementary Note 8, further including a step of supplying power to the water detection means in order to make the water detection means operate.

Supplementary Note 10

A method of setting an operation mode of an electronic device that is able to operate in water and is able to be set in two operation modes, including:
- a step of receiving a radio wave by communication means;
- a step of making water detection means operate in the case where intensity of a reception signal of a radio wave received by the communication means is lower than a threshold level; and
- a step of changing the operation mode of the electronic device from one of the operation modes to the other operation mode in the case where the water detection means detects that the electronic device is immersed in water.

The present invention is based on Japanese Patent Application No. 2011-026390 filed on Feb. 9, 2011. The specification, the scope of claims for patent, and the drawings of Japanese Patent Application No. 2011-026390 are incorporated herein as reference in its entirety.

INDUSTRIAL APPLICABILITY

The present invention is useful to use an electric device in water with reduced electric power.

DESCRIPTION OF REFERENCE NUMERALS

10 Cellular phone
20 First casing
21 Display device
22 Speaker
23 Alarm outputter
25 Imager
26 Lens unit
30 Second casing
31 Console
32 Microphone
34 Vibrator
35 Water sensor
36 Electrode
37 Electrode
38 Circuit board
40 Hinge
50 First operation mode table
51 Second operation mode table
60 Reception mode table
70 First imaging mode table
71 Second imaging mode table
100 Controller
101 CPU
102 ROM
103 RAM
110 Storage
120 Transceiver
121 Timer
150 Power supply
151 Battery

The invention claimed is:

1. An electronic device that is able to operate in water, comprising:
   communication means that receives a radio wave;
   water detection means that detects whether the electronic device is immersed in water or not; and
   control means that makes the communication means determine whether or not intensity of reception signal of a radio wave received by the communication means is lower than a threshold level;
   wherein the communication means determines whether or not the intensity of the reception signal of a radio wave is lower than the threshold level: and
   the control means makes the water detection means operate if the communication means determines that the intensity of the reception signal of a radio wave is lower than the threshold level.

2. The electronic device according to claim 1, wherein the control means supplies power to the water detection means to make the water detection means operate.

3. The electronic device according to claim 1, wherein the electronic device is able to be set, by the control means, in a first operation mode of specifying whether a predetermined function of the electronic device out of water is valid or not and a second operation mode of specifying whether a predetermined function of the electronic device in water is valid or not and,
   in the case where the water detection means detects that the electronic device is immersed in water, the control means sets the electronic device into the second operation mode.

4. The electronic device according to claim 3, wherein a plurality of functions are set to be valid or invalid in the first and second operation modes, and
   a function specified to be valid in the second operation mode is a part of functions specified to be valid in the first operation mode.

5. The electronic device according to claim 3, further comprising image capturing means,
   wherein the first operation mode is a mode of specifying an imaging parameter of the image capturing means out of water, and the second operation mode is a mode of specifying an imaging parameter of the image capturing means in water.

6. The electronic device according to claim 5, wherein the imaging parameter is shutter speed of the image capturing means, and shutter speed specified in the second operation mode is faster than shutter speed specified in the first operation mode.

7. The electronic device according to claim 5, wherein the imaging parameter is a value of ISO sensitivity of the image capturing means, and a value of ISO sensitivity specified in the second operation mode is higher than value of ISO sensitivity specified in the first operation mode.

8. A method of controlling water detection means, comprising:
   a step of receiving a radio wave by communication means;
   a step of determining whether or not intensity of a reception signal of a radio wave is lower than a threshold level by the communication means; and
   a step of making water detection means operate if the communication means determines that intensity of the reception signal of a radio wave received by the communication means is lower than the threshold level.

9. The method of controlling water detection means according to claim 8, further comprising a step of supplying power to the water detection means in order to make the water detection means operate.

10. A method of setting an operation mode of an electronic device that is able to operate in water and is able to be set in two operation modes, comprising:
   a step of receiving a radio wave by communication means;
   a step of determining whether or not intensity of a reception signal of a radio wave is lower than a threshold level by the communication means:
   a step of making water detection means operate if the communication means determines that intensity of the reception signal of a radio wave received by the communication means is lower than the threshold level; and a step of changing the operation mode of the electronic device from one of the operation modes to the other operation mode if the water detection means detects that the electronic device is immersed in water.

* * * * *